(12) United States Patent
Poertzgen et al.

(10) Patent No.: US 6,290,307 B1
(45) Date of Patent: Sep. 18, 2001

(54) BRAKE SYSTEM

(75) Inventors: Gregor Poertzgen, Koblenz; Kurt Mohr, Halsenbach/Ehr, both of (DE)

(73) Assignee: Lucas Industries Public Limited Company (GB)

( * ) Notice: Subject to any disclaimer, the term of this patent is extended or adjusted under 35 U.S.C. 154(b) by 0 days.

(21) Appl. No.: 09/068,682
(22) PCT Filed: Nov. 12, 1996
(86) PCT No.: PCT/EP96/04950
 § 371 Date: May 13, 1998
 § 102(e) Date: May 13, 1998
(87) PCT Pub. No.: WO97/18116
 PCT Pub. Date: May 22, 1997

(30) Foreign Application Priority Data

Nov. 15, 1995 (DE) .............................................. 195 42 656

(51) Int. Cl.$^7$ ...................................................... B60T 8/42
(52) U.S. Cl. ........................................... 303/115.4; 303/10
(58) Field of Search ............................. 303/115.4, 115.5, 303/116.1, 116.2, 113.1, 113.2, 113.5, 68, 11, 114.1, 113.4, 155

(56) References Cited

U.S. PATENT DOCUMENTS

| 4,625,625 | 12/1986 | Reynolds . | |
|---|---|---|---|
| 4,699,436 | * 10/1987 | Klein | 303/114.1 |
| 4,986,612 | * 1/1991 | Arikawa | 303/116.1 |
| 5,085,490 | * 2/1992 | Steinhauser et al. | 303/113.2 |
| 5,207,486 | * 5/1993 | Tanaka | 303/113.2 |
| 5,249,853 | 10/1993 | Reinartz et al. . | |
| 5,295,739 | * 3/1994 | Burgdorf et al. | 303/113.1 |
| 5,713,640 | 2/1998 | Feigel et al. . | |
| 5,769,509 | * 6/1998 | Feigel et al. | 303/116.1 X |
| 5,927,824 | * 7/1999 | Pahl et al. | 303/113.2 |

FOREIGN PATENT DOCUMENTS

| 3431823 | 3/1986 | (DE) . |
| 0618114 | 10/1994 | (EP) . |
| 61041654 | 2/1986 | (JP) . |
| WO 95/19901 | 7/1995 | (WO) . |

* cited by examiner

Primary Examiner—Robert J. Oberleitner
Assistant Examiner—Melanie Torres
(74) Attorney, Agent, or Firm—MacMillan, Sobanski & Todd, LLC

(57) ABSTRACT

A braking system (10) with a master cylinder (12) which comprises at least one cylinder/piston arrangement (14, 16) which can be actuated by a brake pedal (18) for supplying hydraulic fluid to at least one brake circuit (22, 24) is characterized by a controllable pressure source (54, 78, 90, 92) which, under the control of an electronic control unit ECU subjects the piston (16) of the cylinder/piston arrangement (14, 16) in the sense of supplying hydraulic fluid to the brake circuit (22, 24).

21 Claims, 7 Drawing Sheets

BRAKE SYSTEM

The present invention relates to a braking system with a master cylinder which comprises at least one cylinder/piston arrangement which can be actuated by a brake pedal in order to supply hydraulic fluid to at least one brake circuit.

Problems inherent in such braking systems are that it is difficult to enable also a brake power generation which is independent of the brake pedal actuation by the driver. This, however, is necessary for antislip control systems, driving dynamics control systems, automatic vehicle-to-vehicle ranging control. Generally, the brake pressure in the individual wheel brakes is modulated by ABS systems which are arranged in the brake circuit(s).

In conventional vehicle braking systems for motor vehicles the auxiliary energy required for braking is generated by pneumatic brake boosters which are coupled with the intake pipe of the motor in order to provide a vacuum with respect to atmospheric pressure in the brake booster. In modern engines, however, the vacuum is relatively low so that the required auxiliary energy can be provided to the desired extent and with the necessary dynamics.

The present invention is therefore based on the principle of providing the auxiliary energy required for braking by a controllable pressure source. This controllable pressure source can be activated by electrical energy.

Surprisingly, the renunciation of the previous pneumatic brake boosters and the inventive use of a controllable pressure source which is preferably activated by electrical energy in order to subject the piston of the cylinder/piston arrangement in the master cylinder under the control of an electronic control unit in the sense of supplying hydraulic fluid to the brake circuit offers the following considerable advantages.

In the area of the engine compartment rear bulk of the passenger cell considerable installation space becomes available because the previous large-size pneumatic brake boosters are no longer present. In addition, vacuum lines to the intake pipe are omitted. Moreover, a considerably higher pressure difference than in conventional brake boosters can be achieved which enables enhanced dynamics with controlled and/or boosted brake operations to be achieved. Finally, the controlled pressure source can be remotely arranged from the cylinder/piston arrangement of the master cylinder. This has positive effects on the crash behaviour.

According to a first embodiment of the invention the controllable pressure source is formed by a cylinder/piston arrangement whose piston can be axially moved by a motor in order to change the volume of a hydraulic chamber of the cylinder/piston arrangement, with the hydraulic chamber being hydraulically connected with a pressure chamber arranged in the master cylinder, whose change in volume causes an actuation of the master cylinder. The arrangement can be made in such a manner that the motor is operatively connected via a pinion and rack arrangement with the piston of the cylinder/piston arrangement. Alternatively, the arrangement can also be made in such a manner that the motor is operatively connected via a screw spindle/nut arrangement with the piston of the cylinder/piston arrangement.

In this context, it is crucial that a highly dynamic modulation of the pressure acting on the piston of the cylinder/piston arrangement in the master cylinder is enabled by the chosen arrangement.

This is also achieved by another inventive embodiment in which the controllable pressure source is formed by a cylinder/piston arrangement whose piston can be moved by a piezoelectric motor in order to change the volume of a hydraulic chamber of a cylinder/piston arrangement, with the hydraulic chamber being hydraulically connected with a pressure chamber arranged in the master cylinder, whose change in volume causes an actuation of the master cylinder. Due to the fact that piezoelectric motors can generally exert high forces but can perform only small axial strokes, the piezoelectric motor may comprise a transmission member, e.g. a diaphragm transmission.

In order to render the braking system suitable for the application in an antislip control, a driving dynamics control or a hill hold control it should be possible to bring the pressure source into a pressure build-up, pressure holding or pressure relief position. The controllable pressure source may be a hydraulic pump whose inlet side is hydraulically connected with a hydraulic fluid reservoir and whose outlet side is hydraulically connected with a pressure chamber arranged in the master cylinder, the volume change of which causes an actuation of the master cylinder. This applies in particular to hydraulic pumps with a high delivery rate and high pump dynamics.

Preferably the inlet side of the hydraulic pump is hydraulically connected with the outlet side of the hydraulic pump via a pressure limiting valve in order to prevent the burst pressure of the hydraulic system from not being exceeded.

Because some types of hydraulic pumps are not suited for building up the required pressure in the desired and/or required short time, in one embodiment of the invention the outlet side of the hydraulic pump is hydraulically connected with a pressure accumulator. This pressure accumulator can be charged by the pump to approx. 160 bar so that the required pressure level is directly available.

If the hydraulic pump is adapted to supply hydraulic fluid in two delivery directions, the pressure build-up phase as well as the pressure relief phase can be effected by the hydraulic pump. If the hydraulic pump is adapted to supply hydraulic fluid in one sense of delivery and if a pressure relief valve which can be controlled by the electric control unit is arranged between the inlet side and the outlet side of the hydraulic pump, with hydraulic fluid being able in at least one position of the pressure relief valve to flow from the pressure outlet side to the hydraulic fluid reservoir or to the inlet side, respectively, basically the same effect is achieved as in the case of a hydraulic pump which can supply hydraulic fluid in two delivery directions. However, the dynamics in the pressure relief phase are lower.

Some types of hydraulic pump are not self-locking so that a pressure holding phase cannot be effected in an easy manner with such hydraulic pumps. In such cases, a valve which can be controlled by the electronic control unit is arranged between the outlet side of the hydraulic pump and the pressure chamber arranged in the master cylinder, which at least in a first position connects the outlet side of the hydraulic pump with the pressure chamber in the master cylinder, and which at least in a second position connects the pressure chamber in the master cylinder with the hydraulic fluid reservoir.

Preferably the valve which can be controlled by the electronic control unit comprises a third position in which the outlet side of the hydraulic pump, the hydraulic fluid reservoir, and the pressure chamber of the master cylinder are shut off relative to one another.

According to another embodiment the pressure relief valve which can be controlled by the electronic control unit is a rheomagnetic valve, with the inlet side of the hydraulic pump being connected with a hydraulic fluid reservoir into which a rheomagnetic hydraulic fluid can be introduced.

In preferred embodiments of the braking system according to the invention a pressure sensor arrangement is provided which senses the fluid pressure acting on the pressure chamber of the master cylinder and which outputs an electrical signal which is representative of the current fluid pressure to the electronic control unit. Moreover, a sensor arrangement is preferably provided which senses an actuation of the brake pedal and which outputs an electrical signal which is representative of said actuation to the electronic control unit.

Thus the electronic control unit can effect an actuation of the master cylinder as a function of the actuation of the brake pedal but also independent of same. This may either be a boosting of the pedal actuation initiated by the driver or a specific entry into the driver's driving behaviour.

Further characteristics, properties and advantages of the inventive arrangement will be explained in the following description of the presently preferred embodiments, in which.

Figure 6:
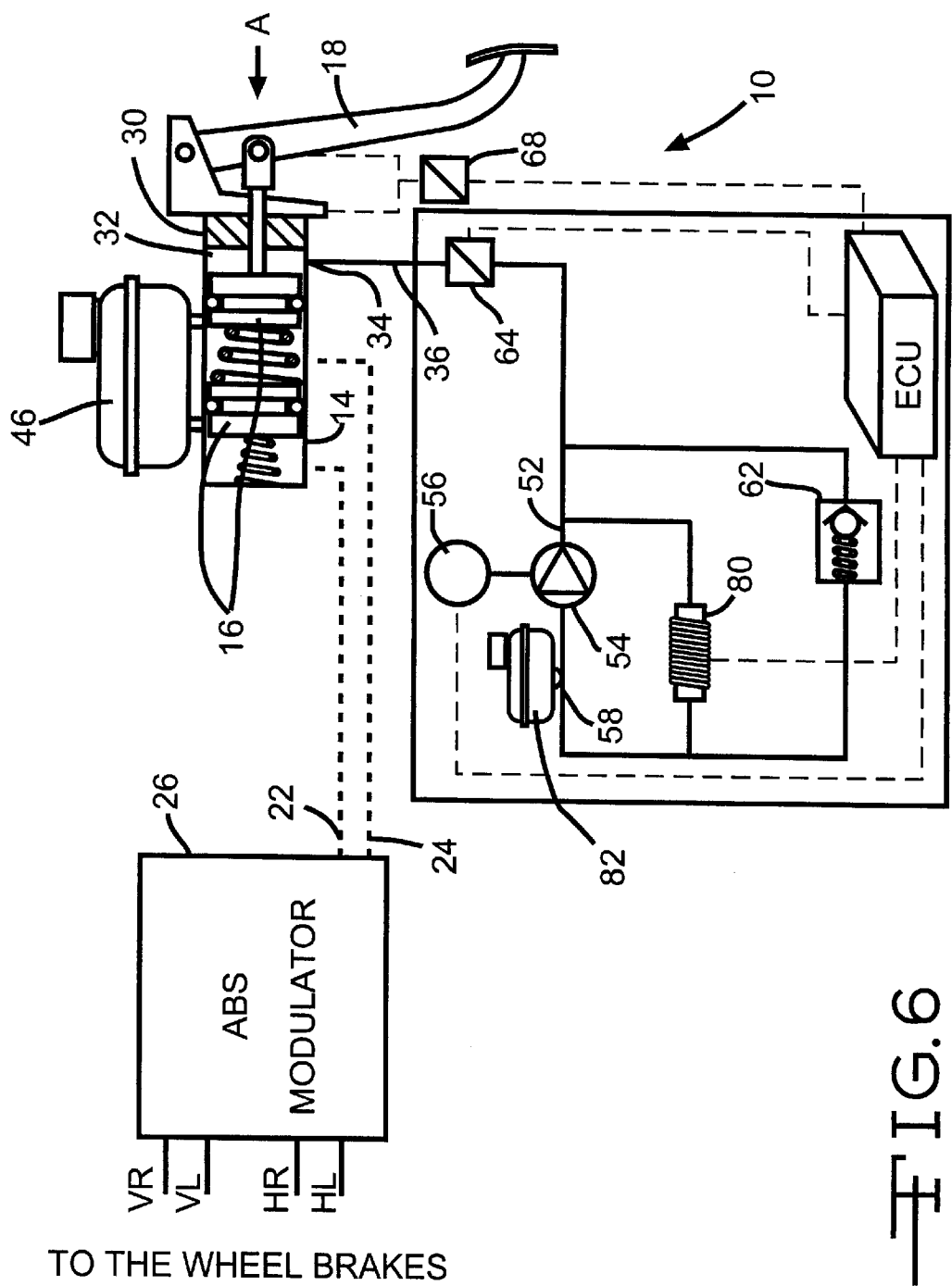
Figure 7:
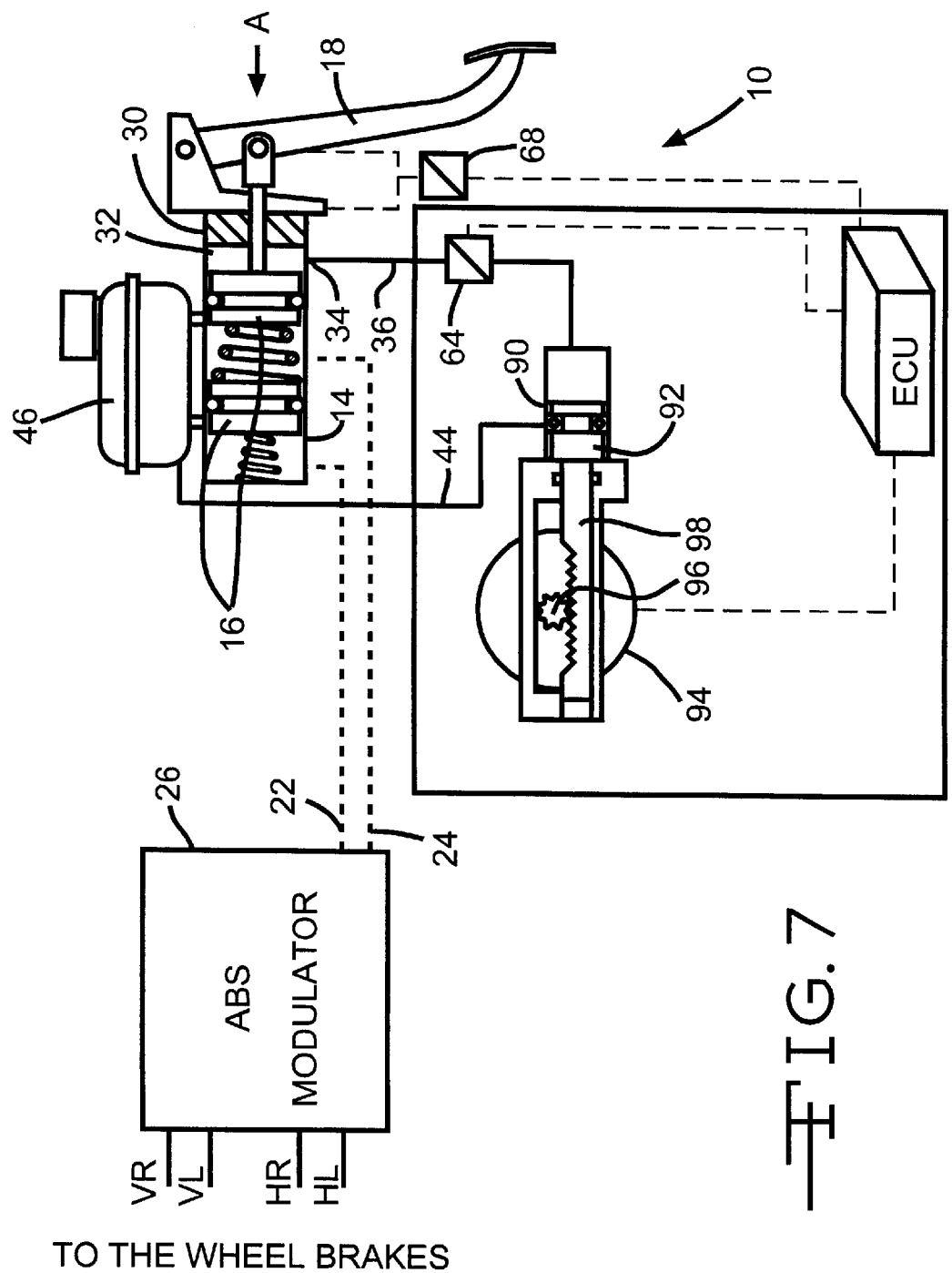

FIG. 6 shows another embodiment of the inventive braking system in which the inlet side of the pump is connected with the outlet side of the pump via a rheomagnetic valve and in which the pump supplies rheomagnetic fluid from a fluid reservoir into the pressure chamber of the cylinder/piston arrangement of the master cylinder; and FIG. 7 shows another embodiment of the inventive braking system in which the controllable pressure source is formed by an electric motor which acts on the piston of a hydraulic cylinder/piston arrangement via a pinion and rack arrangement.

Figure 1:
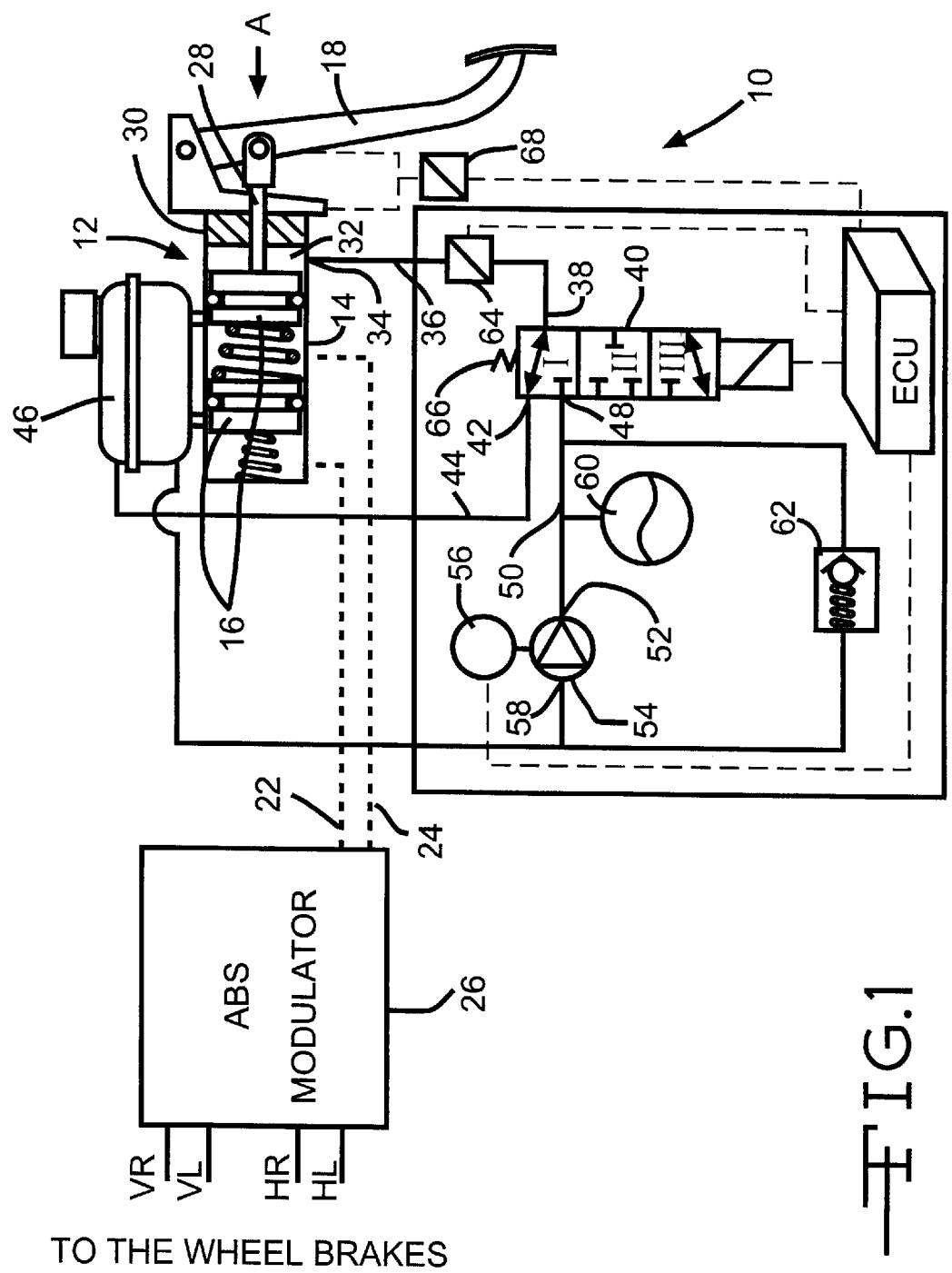
FIG. 1 shows a first embodiment in which the controllable pressure source is formed by a hydraulic pump at the outlet side of which a pressure accumulator is arranged.

FIG. 1 shows a portion of a braking system 10 for motor vehicles with a master cylinder 12 which comprises a cylinder/piston arrangement 14, 16 which can be actuated via a brake pedal 18 in order to supply hydraulic fluid to two brake circuits 22, 24. An ABS modulation means 26 is incorporated in the brake circuit 22, 24 for the controlled application of the four wheel brakes (VR, VL, HR, HL) with hydraulic fluid. The cylinder 14 of the cylinder/piston arrangement in the master cylinder 12 is designed as a twin cylinder in order to be able to separately control the two brake circuits 22, 24.

The piston 16 is coupled with the brake pedal 18 via an actuation rod 28 which protrudes into the cylinder 14. At its end facing towards the brake pedal 18, the cylinder 14 is covered in a fluid tight manner by a cover 30 so that a chamber 32 is formed between the piston 16 and the cover 30. The chamber 32 is connected with a terminal 38 of an electromagnetically controllable 3/2-way valve 40 via a terminal 34 and via a hydraulic line 36. A further terminal 42 of the valve 40 is connected via a hydraulic line 44 with a hydraulic fluid reservoir 46 which also feeds the cylinder/piston arrangement 14, 16 of the master cylinder 12. A third terminal 48 is connected with a hydraulic pump 54 via a hydraulic line 50 of an outlet side 52.

The hydraulic pump 54 is activated via a motor 56 which is controlled by an electronic control unit ECU. The electronic control unit ECU also controls the actuation of the valve 40. An inlet side 58 of the hydraulic pump 54 is also connected with the hydraulic fluid reservoir 4-6. In this manner, the hydraulic pump 54 acts as the pressure source which can be controlled by the electronic control unit ECU which applies hydraulic fluid to the piston 16 of the cylinder/piston arrangement 14, 16 when hydraulic fluid reaches the pressure chamber 32 from the outlet side 52 of the hydraulic pump 54 via the hydraulic line 50, the valve 40, the hydraulic line 36 so that the piston 16 moves in the direction of arrow A when the hydraulic fluid increases the volume of the pressure chamber 32. The consequence of this is that the brake circuits 22, 24 are supplied with hydraulic fluid from the master cylinder so that the pressure at the-wheel brakes VR, VL, HR and/or HL increases.

A pressure accumulator 60 is connected at the outlet side 52 of the hydraulic pump 54. This serves to compensate any insufficient dynamics in the delivery rate of the hydraulic pump 54. In order to not exceed the burst pressure of the system a pressure limiting valve 62 (DBV) is provided which connects the pressure inlet side 58 with the outlet side 52 of the hydraulic pump 54.

The valve 40 can be brought into three positions. In the first (illustrated) position I the pressure chamber 32 is connected with the hydraulic fluid reservoir 46. This corresponds to a pressure relief phase. In the second position II the pressure chamber 32, the hydraulic fluid reservoir 46, and the hydraulic pump 54 or the hydraulic accumulator 60 are shut off relative to one another. This corresponds to a pressure holding phase. In a third position the outlet side 52 of the hydraulic pump 54 or the hydraulic accumulator 60, respectively, is connected with the terminal 38 of the valve 40 via the terminal 48 of the valve 40 so that hydraulic fluid can flow from the pressure accumulator 60 or the hydraulic pump 54, respectively, into the pressure chamber 32. This corresponds to a pressure build-up phase. In its (illustrated) not actuated position, the valve 40 assumes the first position I because a spring element 66 urges the valve member into this position.

A pressure sensor 64 is arranged in the hydraulic line 36, which transmits an electrical signal to the electronic control unit ECU, which is representative of the pressure in the hydraulic line 36 or in the pressure chamber 32, respectively. In addition, a travel sensor 68 is coupled with the brake pedal 18 for transmitting a signal to the electronic control unit ECU, which is representative of the actuation of the brake pedal. In lieu of the travel sensor 68, any other sensor (angle of rotation sensor, power sensor, acceleration sensor etc.) may be employed.

Figure 2:
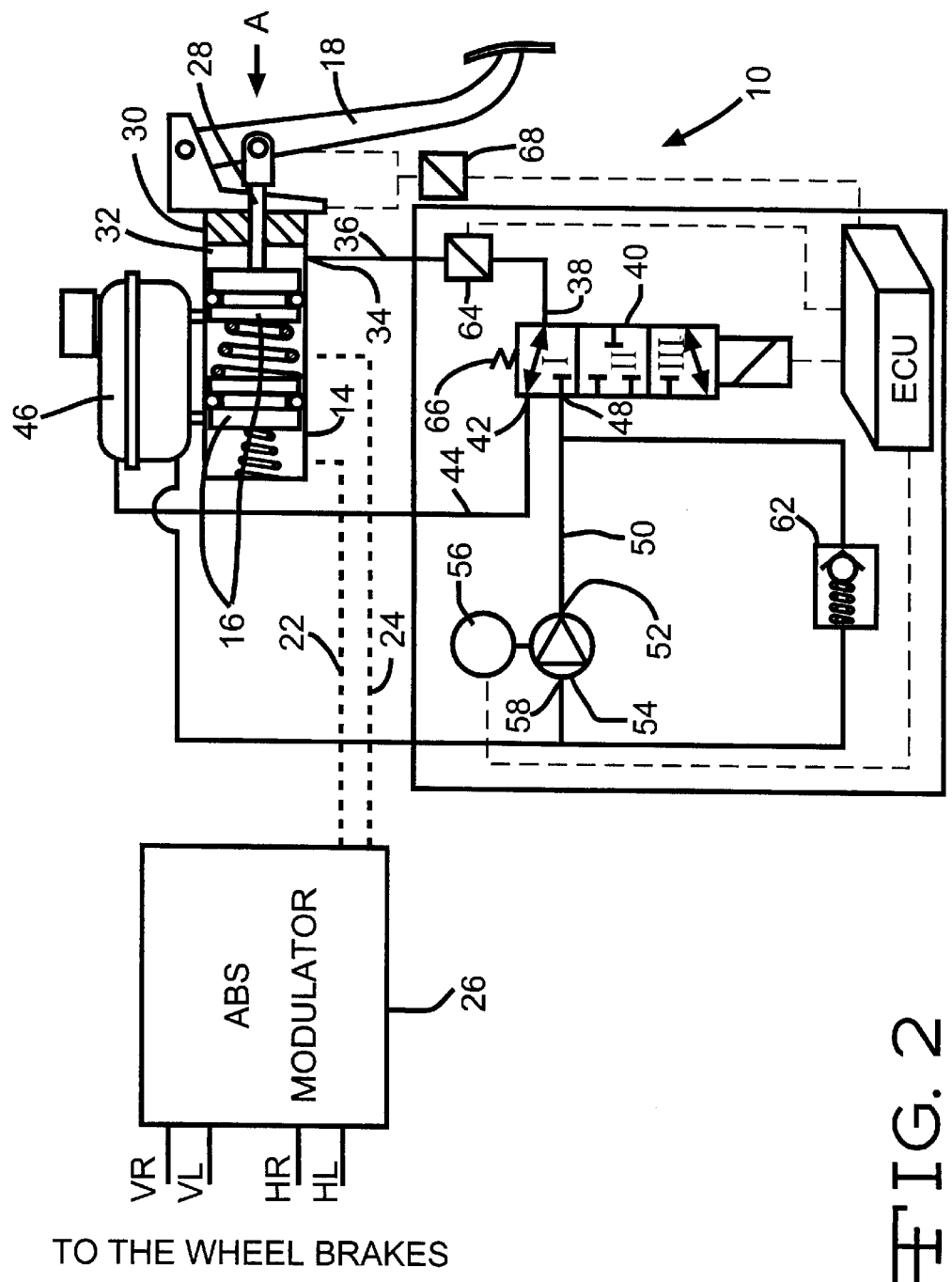
FIG. 2 shows an inventive embodiment in which the hydraulic pump is dimensioned in such a manner that a pressure accumulator at the outlet side of the hydraulic pump is not required.

The embodiment illustrated in FIG. 2 differs from the embodiment according to FIG. 1 only in that the pressure accumulator 60 from FIG. 1 is omitted because a pump with higher delivery rate and higher pump dynamics is employed. It is thereby possible to omit the pressure accumulator 60 because the pressure accumulator which is effective in particular at the beginning of the pressure build-up phase is substituted by the higher delivery rate of the hydraulic pump 54. Otherwise, the embodiments according to FIG. 1 and FIG. 2 do not differ from each other.

Figure 3:
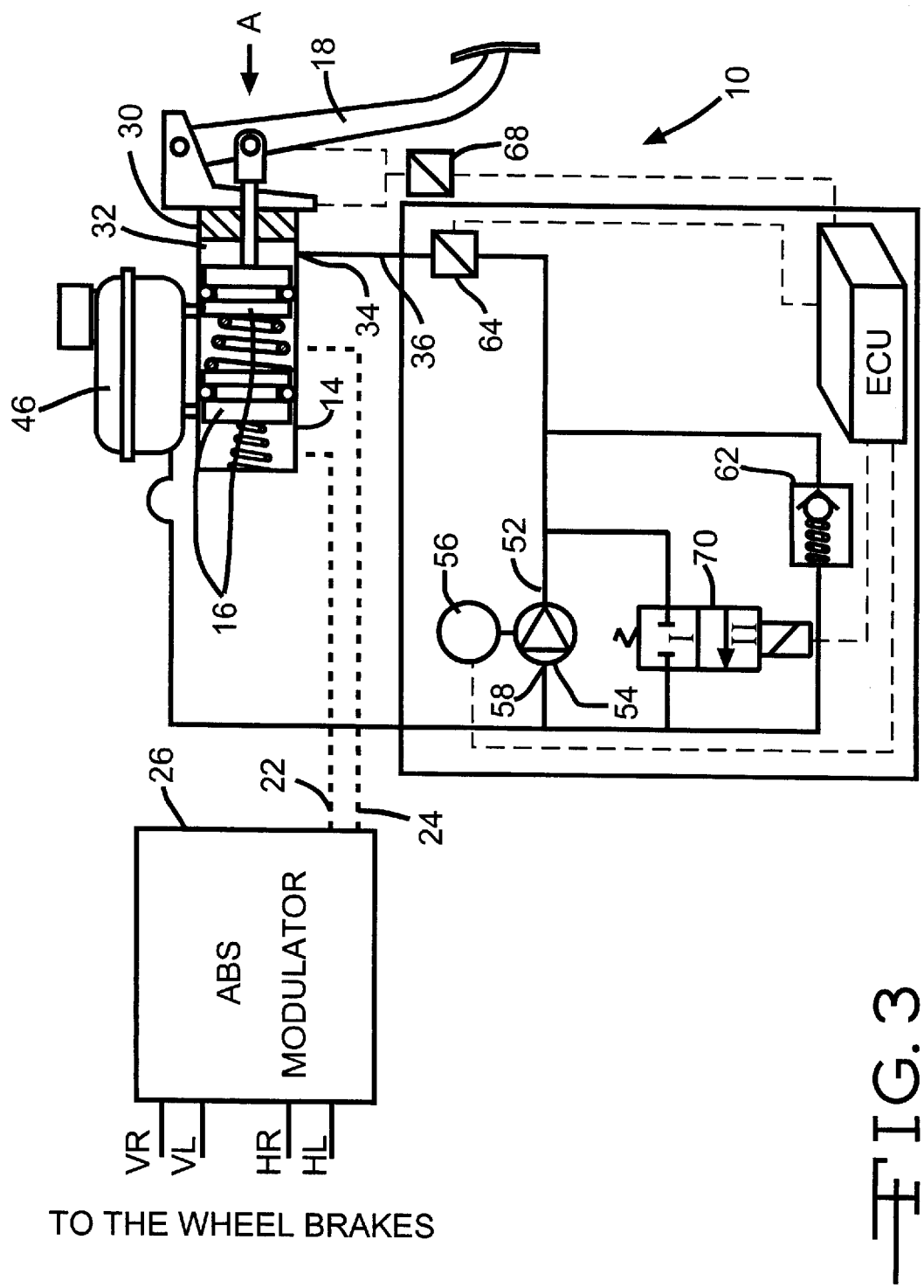
FIG. 3 shows a third embodiment in which a hydraulic pump is used as the controllable pressure source, whose sense of delivery is not reversible and whose pressure inlet side is connected with the pressure outlet side by means of a pressure relief valve.

FIG. 3 shows an embodiment which is simplified compared to FIGS. 1 and 2 in that the 3/2-way electromagnetic valve 40 between the outlet side 52 of the hydraulic pump 54 and the pressure chamber 32 is omitted. This is possible if the hydraulic pump 54 is adapted to hold a pressure level built up in the pressure chamber 32. If the pump employed for this purpose has only one sense of delivery it is necessary to provide a pressure relief valve 70 which either connects the inlet side 58 of the hydraulic pump 54 with the outlet side 52 (position II in FIG. 3) or disconnects the pressure inlet side 58 from the pressure outlet side 53 (illustrated position I in FIG. 3). Otherwise, the embodiments according to FIGS. 1, 2 do not differ from the embodiment according to FIG. 3.

Figure 4:
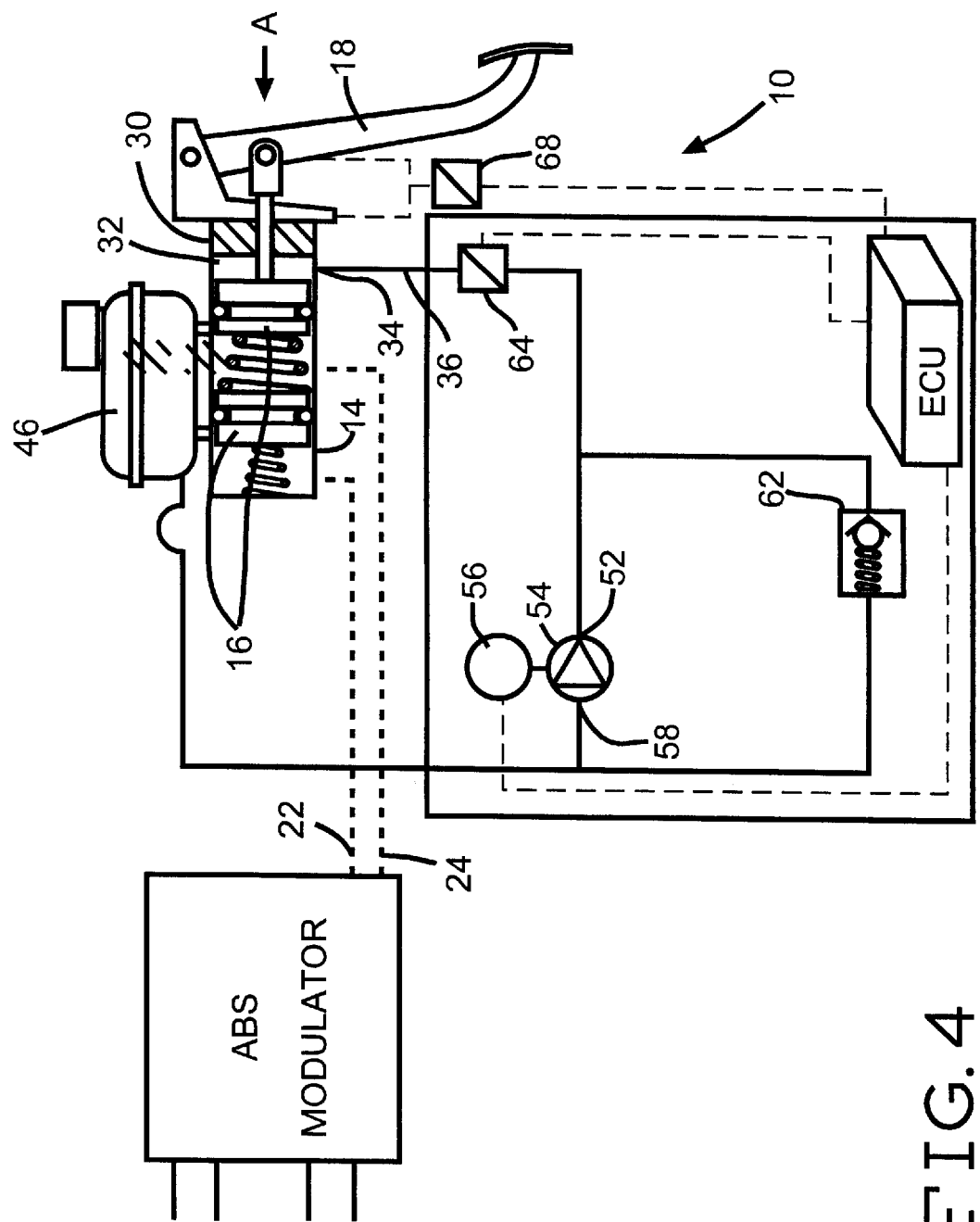
FIG. 4 shows an inventive embodiment in which the controllable pressure source is formed by a hydraulic pump whose sense of delivery is reversible and which is able to hold any pressure built up at the outlet side.

The embodiment according to FIG. 4 differs from the embodiment according to FIG. 3 in that the employed pump 54 can hold a pressure level prevailing in the pressure chamber 32 (holding phase) as well reversing its sense of delivery (pressure build-up phase or pressure relief phase, respectively). The valve 70 shown in FIG. 3 is therefore omitted.

Figure 5:
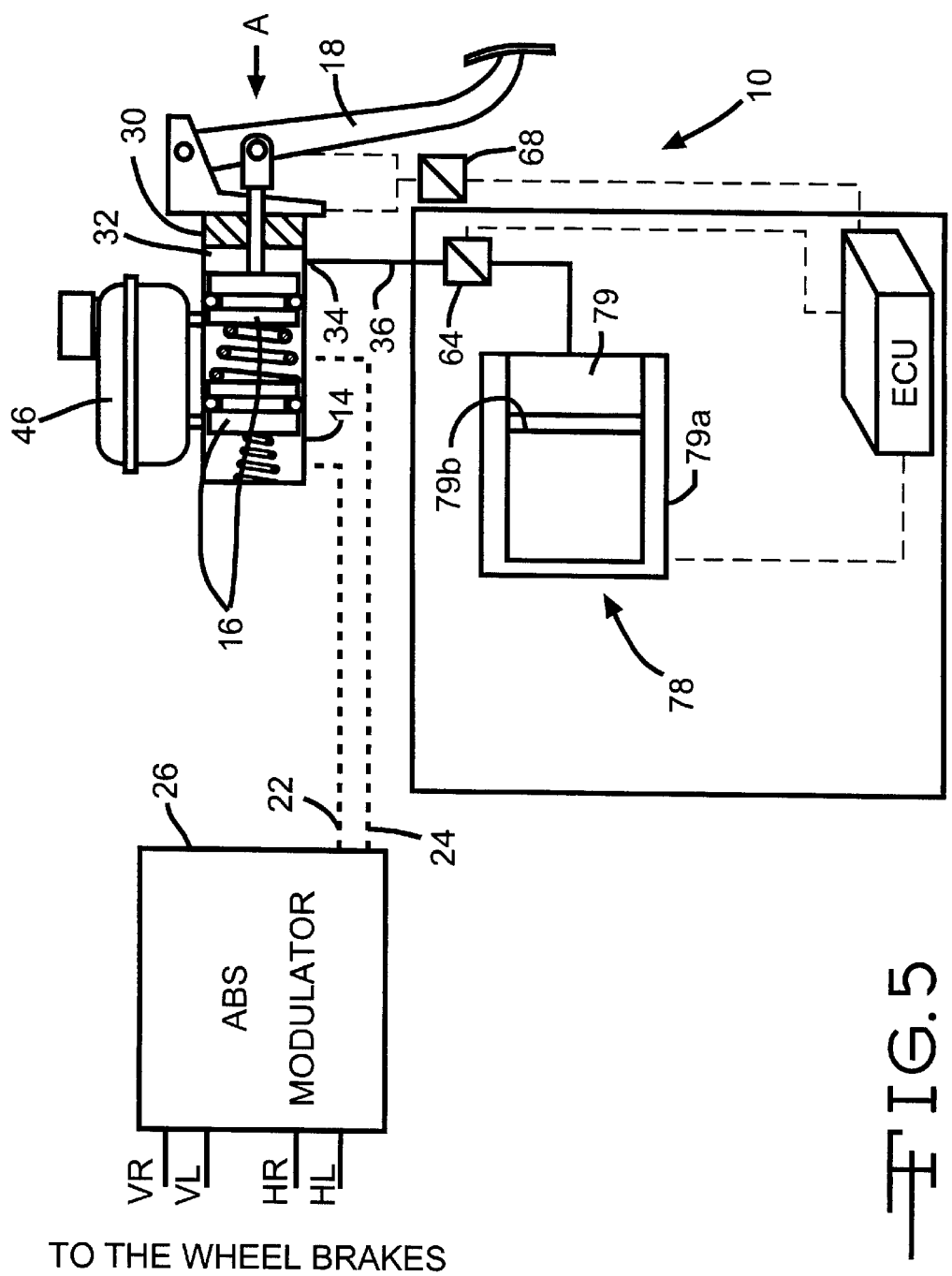
FIG. 5 shows another embodiment of the inventive braking system in which a piezoelectric motor is employed as the controllable pressure source.

FIG. 5 shows a piezoelectric motor 78 as the controllable pressure source. The pressure build-up behaviour, the holding phase, and the pressure relief behaviour in the pressure chamber 32 can be controlled in any desired manner via suitably driving the piezoelectric motor 78 by means of the electronic control unit ECU.

Because the piezoelectric motor as such can perform only small strokes, the piezoelectric motor comprises a transfer member which is designed as a diaphragm transmission.

FIG. 6 shows an embodiment which is modified compared to FIG. 3 in that the pressure relief valve 70 which can be controlled by the electronic control unit is designed as a rheomagnetic valve 80. Unless a rheomagnetic fluid is also used in the brake circuits 22, 24 it is necessary (as shown in FIG. 6) to provide a reservoir 82 for the rheomagnetic fluid, which is connected with the inlet side 58 of the hydraulic pump 54, with the rheomagnetic valve 80 connecting the outlet side 52 of the hydraulic pump 54 with the inlet side 58 or disconnecting the inlet side 58 from the outlet side 52. Otherwise, the embodiment according to FIG. 3 does not differ from the embodiment according to FIG. 6.

FIG. 7 shows an embodiment of an inventive braking system, in which the controllable-pressure source is formed by a cylinder/piston arrangement 90, 92. The piston 92 of this cylinder/piston arrangement 90, 92 is axially movable by means of a motor 94. For this purpose the motor 94 is operatively connected with the piston 92 of the cylinder/piston arrangement 90, 92 via a pinion and rack arrangement 96, 98. By means of suitably controlling the motor 94 by the electronic control unit ECU the pressure build-up phase, the pressure holding phase and the pressure-relief phase can be achieved in the desired manner.

What is claimed is:

1. A braking system with
   a master cylinder which comprises at least one cylinder/piston arrangement which can be actuated by a brake pedal for supplying hydraulic fluid to at least one brake circuit and which comprises a pressure chamber arranged in the master cylinder, a volume increase of which subjects the piston of the cylinder/piston arrangement to supply hydraulic fluid to the brake circuit, and with
   a controllable pressure source under control of an electronic control unit which is a hydraulic pump whose inlet side is hydraulically connected with a hydraulic fluid reservoir and whose outlet side is hydraulically connected with the pressure chamber, characterized in that
   the inlet side of the hydraulic pump is hydraulically connected with the outlet side of the hydraulic pump via a pressure limiting valve.

2. The braking system according to claim 1, characterized in that
   the controllable pressure source is formed by a cylinder/piston arrangement whose piston is capable of axial movement by a motor in order to change the volume of a hydraulic chamber of the cylinder/piston arrangement, with the hydraulic chamber being hydraulically connected with a pressure chamber arranged in the master cylinder, whose change in volume causes an actuation of the master cylinder.

3. The braking system according to claim 2, characterized in that
   the motor is operatively connected via a pinion and rack arrangement with the piston of the cylinder/piston arrangement.

4. The braking system according to claim 2, characterized in that
   the motor is operatively connected via a screw spindle/nut arrangement with the cylinder of the cylinder/piston arrangement.

5. The braking system according to claim 1, characterized in that
   the controllable pressure source is formed by a cylinder/piston arrangement whose piston can be moved by a piezoelectric motor in order to change the volume of a hydraulic chamber of a cylinder/piston arrangement, with the hydraulic chamber being hydraulically connected with a pressure chamber arranged in the master cylinder, whose change in volume causes an actuation of the master cylinder.

6. The braking system according to claim 5, characterized in that
   the piezoelectric motor comprises a diaphragm transmission.

7. The braking system according to claim 1, characterized in that
   the outlet side of the hydraulic pump is hydraulically connected with a pressure accumulator.

8. The braking system according to claim 7, characterized in that
   the hydraulic pump is adapted to supply hydraulic fluid in two delivery directions.

9. The braking system according to claim 7, characterized in that
   the hydraulic pump is adapted to supply hydraulic fluid in only one sense of delivery and a pressure relief valve which can be controlled by the electric control unit is arranged between the inlet side and the outlet side of the hydraulic pump, with hydraulic fluid being able in at least one position of the pressure relief valve to flow from the outlet side to the hydraulic fluid reservoir.

10. The braking system according to claim 7, characterized in that
   a valve which can be controlled by the electronic control unit is arranged between the outlet side of the hydraulic pump and the pressure chamber arranged in the master cylinder, which at least in one position connects the outlet side of the hydraulic pump with the pressure chamber in the master cylinder, and which at least in another position connects the pressure chamber in the master cylinder with the hydraulic fluid reservoir.

11. The braking system according to claim 10, characterized in that the valve which can be controlled by the electronic control unit comprises another position in which the outlet side of the hydraulic pump, the hydraulic fluid reservoir, and the pressure chamber of the master cylinder are shut off relative to one another.

12. The braking system according to claim 11, characterized in that the pressure relief valve which can be controlled by the electronic control unit is a rheomagnetic valve, and the inlet side of the hydraulic pump is connected with a hydraulic fluid reservoir into which a rheomagnetic hydraulic fluid can be introduced.

13. The braking system according to claim 1, characterized in that a pressure sensor arrangement is provided which senses the fluid pressure acting on the pressure chamber of the master cylinder and which outputs an electrical signal which is representative of the current fluid pressure to the electronic control unit.

14. The braking system according to claim 1, characterized in that the pressure chamber for actuating the cylinder/piston arrangement in the master cylinder is connected with the outlet side only of the hydraulic pump.

15. The braking system according to claim 7, characterized in that the pressure chamber for actuating the cylinder/piston arrangement in the master cylinder is connected with the outlet side only of the hydraulic pump.

16. The braking system according to claim 10, characterized in that the pressure chamber for actuating the cylinder/piston arrangement in the master cylinder is connected with the outlet side only of the hydraulic pump.

17. The braking system according to claim 1, characterized in that a sensor arrangement is provided which senses an actuation of the brake pedal and which outputs an electrical signal which is representative of said actuation to the electronic control unit.

18. The braking system according to claim 1, characterized in that the hydraulic pump is adapted to supply hydraulic fluid in two delivery directions.

19. The braking system according to claim 1, characterized in that the hydraulic pump is adapted to supply hydraulic fluid in only one sense of delivery and a pressure relief valve which can be controlled by the electric control unit is arranged between the inlet side and the outlet side of the hydraulic pump, with hydraulic fluid being able in at least one position of the pressure relief valve to flow from the outlet side to the hydraulic fluid reservoir.

20. The braking system according to claim 1, characterized in that a valve which can be controlled by the electronic control unit is arranged between the outlet side of the hydraulic pump and the pressure chamber arranged in the master cylinder, which at least in one position connects the outlet side of the hydraulic pump with the pressure chamber in the master cylinder, and which at least in another position connects the pressure chamber in the master cylinder with the hydraulic fluid reservoir.

21. The braking system according to claim 20, characterized in that the valve which can be controlled by the electronic control unit comprises another position in which the outlet side of the hydraulic pump, the hydraulic fluid reservoir, and the pressure chamber of the master cylinder are shut off relative to one another.

* * * * *